United States Patent
Urac et al.

(10) Patent No.: US 12,497,909 B2
(45) Date of Patent: Dec. 16, 2025

(54) FLANGE WITH STRESS ATTENTUATION FEATURE

(71) Applicant: Pratt & Whitney Canada Corp., Longueuil (CA)

(72) Inventors: Tibor Urac, Mississauga (CA); Shervin Aslani Amoli, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/655,958

(22) Filed: May 6, 2024

(65) Prior Publication Data

US 2025/0341179 A1    Nov. 6, 2025

(51) Int. Cl.
*F01D 25/24* (2006.01)
*F01D 25/26* (2006.01)

(52) U.S. Cl.
CPC .......... *F01D 25/243* (2013.01); *F01D 25/26* (2013.01); *F05D 2220/323* (2013.01); *F05D 2230/60* (2013.01); *F05D 2240/14* (2013.01)

(58) Field of Classification Search
CPC ....... F16L 23/003; F16L 23/02; F16L 23/024; F16L 27/1012; F01D 25/243; F01D 25/24; F01D 1/023; F01D 1/16; F01D 25/26; F01D 9/04; F05D 2220/323; F05D 2230/60; F05D 2240/14
See application file for complete search history.

(56) References Cited

U.S. PATENT DOCUMENTS

| | | | |
|---|---|---|---|
| 2,211,874 A | 8/1940 | Wilson | |
| 3,273,920 A | 9/1966 | Anderson et al. | |
| 4,020,971 A | 5/1977 | Ostbo | |
| 4,685,193 A * | 8/1987 | Faria | F16L 23/16 29/428 |
| 4,772,033 A | 9/1988 | Nash | |
| 7,495,173 B2 * | 2/2009 | Jung | F16L 23/032 174/91 |
| 7,938,618 B2 | 5/2011 | Baude | |
| 10,772,167 B2 * | 9/2020 | Balkcum | H05B 6/707 |

(Continued)

FOREIGN PATENT DOCUMENTS

| | | |
|---|---|---|
| GB | 510505 A | 8/1939 |
| GB | 722391 A | 1/1955 |

OTHER PUBLICATIONS

Search Report issued in European Patent Application No. 25174590.7; Date of Mailing Oct. 17, 2025 (12 pages).

*Primary Examiner* — Eric J Zamora Alvarez
(74) *Attorney, Agent, or Firm* — CANTOR COLBURN LLP

(57) ABSTRACT

A cooling fan housing is provided. The cooling fan housing includes an inner housing and an outer housing. The inner housing includes inner forward and inner rearward flanges on either side of an inner annulus. The inner rearward flange includes a recessed portion proximate to the inner annulus and a non-recessed portion remote from the inner annulus. The outer housing includes outer forward and outer rearward flanges on either side of an outer annulus. The outer and inner forward flanges are attachable in a tight-fitting condition. The outer rearward flange and the non-recessed portion of the inner rearward flange are attachable in a tight-fitting condition with the recessed portion of the inner rearward flange forming a gap with the outer rearward flange.

18 Claims, 5 Drawing Sheets

(56) References Cited

U.S. PATENT DOCUMENTS

| | | | |
|---|---|---|---|
| 11,137,093 B2* | 10/2021 | McGilvray, Jr. | F16L 23/12 |
| 11,280,223 B2* | 3/2022 | Tanno | F04D 29/528 |
| 2008/0053059 A1* | 3/2008 | Olver | F02C 7/141 |
| | | | 60/226.1 |
| 2017/0241434 A1* | 8/2017 | Veitch | F04D 29/644 |

\* cited by examiner

FLANGE WITH STRESS ATTENTUATION FEATURE

BACKGROUND

The present disclosure relates to cooling fan housings of auxiliary power units (APUs) and, in particular, to a flange with a stress attenuation feature of a cooling fan housing of an APU of an aircraft.

In gas turbine engines, a casing assembly is provided to house and support a number of rotors such as fan, compressor and turbine rotors. A conventional casing assembly may include a fan case, an intermediate case, a compressor case, a gas generator case, a turbine case and a turbine exhaust case arranged about a central axis of the engine. The individual cases may be connected one to another for example by flanges and fasteners. A spigot joint may be provided between two connected cases in order to provide concentricity control of the two cases.

SUMMARY

According to an aspect of the disclosure, a cooling fan housing is provided. The cooling fan housing includes an inner housing and an outer housing. The inner housing includes inner forward and inner rearward flanges on either side of an inner annulus. The inner rearward flange includes a recessed portion proximate to the inner annulus and a non-recessed portion remote from the inner annulus. The outer housing includes outer forward and outer rearward flanges on either side of an outer annulus. The outer and inner forward flanges are attachable in a tight-fitting condition. The outer rearward flange and the non-recessed portion of the inner rearward flange are attachable in a tight-fitting condition with the recessed portion of the inner rearward flange forming a gap with the outer rearward flange.

In accordance with additional or alternative embodiments, the inner housing includes radial walls defining the sides of the inner annulus and a horizontal member extending from a forward one of the radial walls.

In accordance with additional or alternative embodiments, at least one of rivets, bolts and a weld are attached to at least the outer and inner forward flanges.

In accordance with additional or alternative embodiments, respective dimensions of the outer and inner forward flanges are different from respective dimensions of the outer and inner rearward flanges.

In accordance with additional or alternative embodiments, an aspect ratio of the gap is about 10 or more to 1.

In accordance with additional or alternative embodiments, a compliant seal in the gap.

In accordance with additional or alternative embodiments, the inner and outer housings include materials having different coefficients of thermal expansion (CTEs).

In accordance with additional or alternative embodiments, the inner rearward flange further includes a wall section extending radially outwardly from the recessed portion.

According to an aspect of the disclosure, a method of assembling a cooling fan housing is provided. The method includes at least one or more of casting, machining and additively manufacturing an inner housing including inner forward and inner rearward flanges on either side of an inner annulus, at least one or more of casting, machining and additively manufacturing an outer housing comprising outer forward and outer rearward flanges on either side of an outer annulus, machining at least one of the inner rearward flange and the outer rearward flange to comprise a recessed portion proximate to at least one of the inner and outer annuluses, wherein the inner rearward flange and the outer rearward flange each comprise a non-recessed portion, attaching the outer and inner forward flanges in a tight-fitting condition and further attaching at least a portion of the non-recessed portion of the outer rearward flange to at least a portion of the non-recessed portion of the inner rearward flange in a tight-fitting condition, with the recessed portion of the inner and/or outer rearward flange forming a gap with the outer and/or inner rearward flange.

In accordance with additional or alternative embodiments, the at least one or more of the casting, the machining and the additively manufacturing of the inner housing includes at least one or more of casting, machining and additively manufacturing radial walls defining the sides of the inner annulus and at least one or more of casting, machining and additively manufacturing a horizontal member extending from a forward one of the radial walls.

In accordance with additional or alternative embodiments, the method further includes inserting a compliant seal into the gap following the further attaching.

According to an aspect of the disclosure, a cooling fan housing is provided and includes a first housing including a first forward flange and a first rearward flange on either side of a first annulus and a second housing including a second forward flange and a second rearward flange on either side of a second annulus. At least one of the first and the second rearward flanges includes a recessed portion proximate to the first and second annuluses and a non-recessed portion remote from the first and second annuluses. The first and the second forward flanges are attachable in a tight-fitting condition. The non-recessed portion of the at least one of the first and the second rearward flanges are attachable in a tight-fitting condition, with the recessed portion of the at least one of the first and the second rearward flanges forming a gap.

In accordance with additional or alternative embodiments, at least one of the first housing and the second housing includes integral stator vanes.

In accordance with additional or alternative embodiments, the first housing includes radial walls defining the sides of the first annulus and a horizontal member extending from a forward one of the radial walls.

In accordance with additional or alternative embodiments, at least one of rivets, bolts and a weld attach at least the first and the second forward flanges.

In accordance with additional or alternative embodiments, respective dimensions of the first and second forward flanges are different from respective dimensions of the first and second rearward flanges.

In accordance with additional or alternative embodiments, an aspect ratio of the gap is about 10 or more to 1.

In accordance with additional or alternative embodiments, a compliant seal is in the gap.

In accordance with additional or alternative embodiments, the first and the second housings include materials having different coefficients of thermal expansion (CTEs).

In accordance with additional or alternative embodiments, the at least one of the first rearward flange and the second rearward flange further includes a wall section extending radially into the recessed portion.

Additional features and advantages are realized through the techniques of the present disclosure. Other embodiments and aspects of the disclosure are described in detail herein and are considered a part of the claimed technical concept.

For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
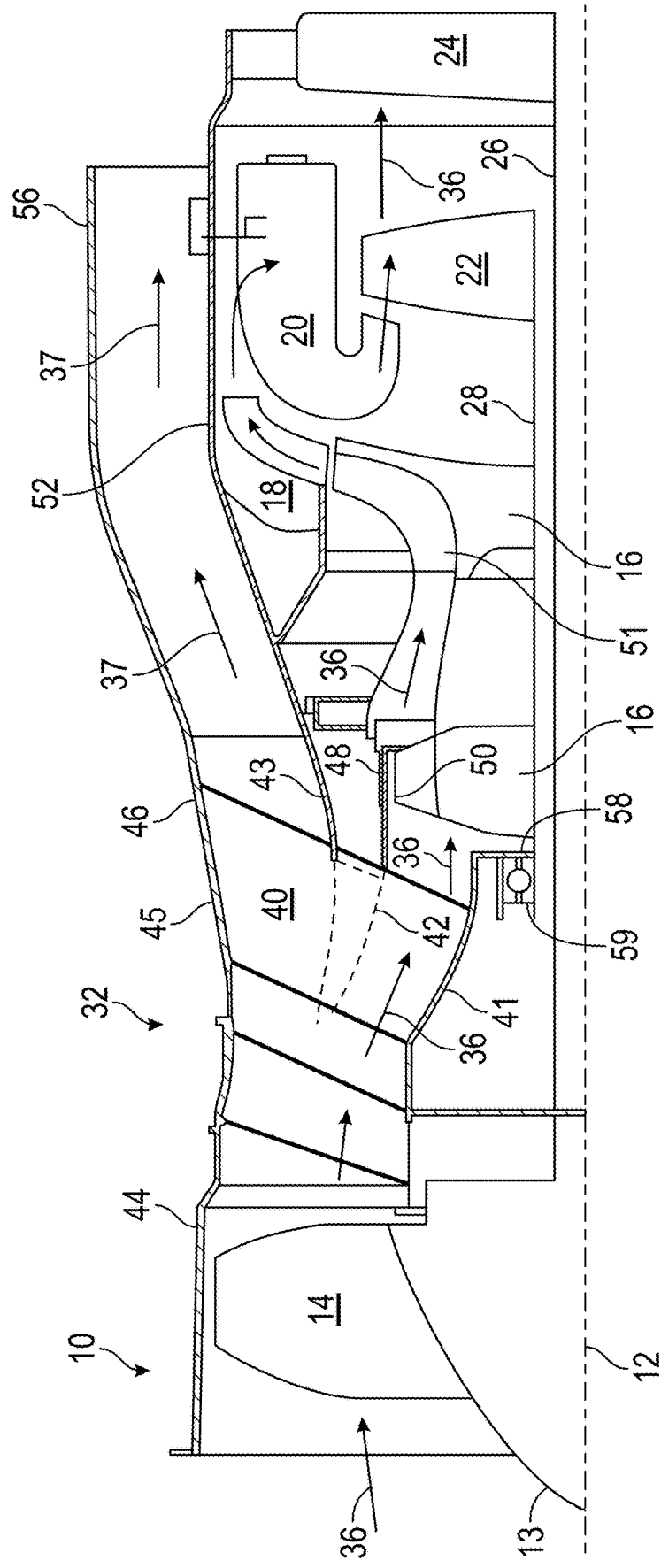
FIG. 1 is a partial schematic side cross-sectional view of an example gas turbine engine in accordance with embodiments of this disclosure.

FIG. 1 illustrates an exemplary turbofan gas turbine engine 10 which includes in serial flow communication about a longitudinal central axis 12, a fan assembly 13 having a plurality of circumferentially spaced fan blades 14, a high pressure compressor (HPC) assembly 16 having a plurality of circumferentially spaced compressor blades 50 and blades 51, a diffuser 18, a combustor 20, a high pressure turbine (HPT) 22 and a low pressure turbine (LPT) 24. The LPT 24 is connected to the fan assembly 13 by a low pressure (LP) shaft 26 and the HPT 22 is connected to the HPC assembly 16 by a high pressure (HP) shaft 28.

It should be noted that the terms "axial", "radial" and "circumferential" used for various components throughout the description and appended claims are defined with respect to the longitudinal central axis 12 of the engine.

A generally cylindrical casing assembly 32 envelops the gas turbine engine 10 and defines a main flow path (indicated by arrows) 36 through a core of gas turbine engine 10 and a bypass flow path (indicated by arrows) 37.

It should be noted that the terms "upstream", "downstream", "front" and "aft" are defined with respect to the direction of the air flow entering into and passing through the main flow path 36 of the engine 10.

The casing assembly 32 may include a generally cylindrical fan case 44, which houses the fan assembly 13, a generally cylindrical intermediate case 46 downstream of the fan case 44 and a gas generator case 52 downstream of the intermediate case 46. The intermediate case 46 may include a bearing seat 58 for mounting an HP bearing 59 thereto. The casing assembly 32 may further include a cylindrical bypass duct case 56 generally surrounding the gas generator case 52 and a cylindrical compressor shroud 48 which encircles blade tips of the HPC assembly 16. The cylindrical compressor shroud 48, the gas generator case 52 and the bypass duct case 56 are located downstream of and are connected to the intermediate case 46.

The intermediate case 46 may include a number of cylindrical walls 41, 42, 43 and 45 which are co-axially positioned and radially spaced apart one from another. In a radially outward sequence, the cylindrical wall 41 may be an inner hub of the intermediate case 46 to support the bearing seat 58, the cylindrical walls 42 and 43 in combination may form at least part of an annular split configuration for dividing the bypass flow path 37 from the main flow path 36, and the cylindrical wall 45 may be an outer wall of the intermediate case 46 and may be connected to the bypass duct 56. The cylindrical walls 42 and 43 of the intermediate case 46 may be connected to the compressor shroud 48 and the gas generator case 52.

The intermediate case 46 may further have a plurality of radially extending struts 40 which may each be configured as a hollow structure. The radially extending struts 40 may be circumferentially spaced apart one from another, each connecting or being integrated with the respective cylindrical walls 41, 42, 43, and 45 and thus in combination support all the cylindrical walls 41, 42, 43 and 45 in an integrated configuration to form the intermediate case 46.

At various locations of the casing assembly 32, assembly stresses from tight fits can affect adjacent features that are structurally sensitive. A need therefore exists for an improved casing assembly that reduces the assembly stresses.

Thus, as will be described below, a casing assembly is provided with a stress attenuation feature that alleviates assembly stresses. The stress attenuation feature can be provided at a joining flange or spigot joint proximate to a stiff vertical section of the casing assembly.

Although depicted as a two-spool turbofan engine, this is not intending to be so limiting and the techniques described herein can be applicable to alternate engine configurations, such as APUs configured with at least some of the features of the engine 10 (e.g., compressor, combustor, turbine, etc.).

Figure 2:
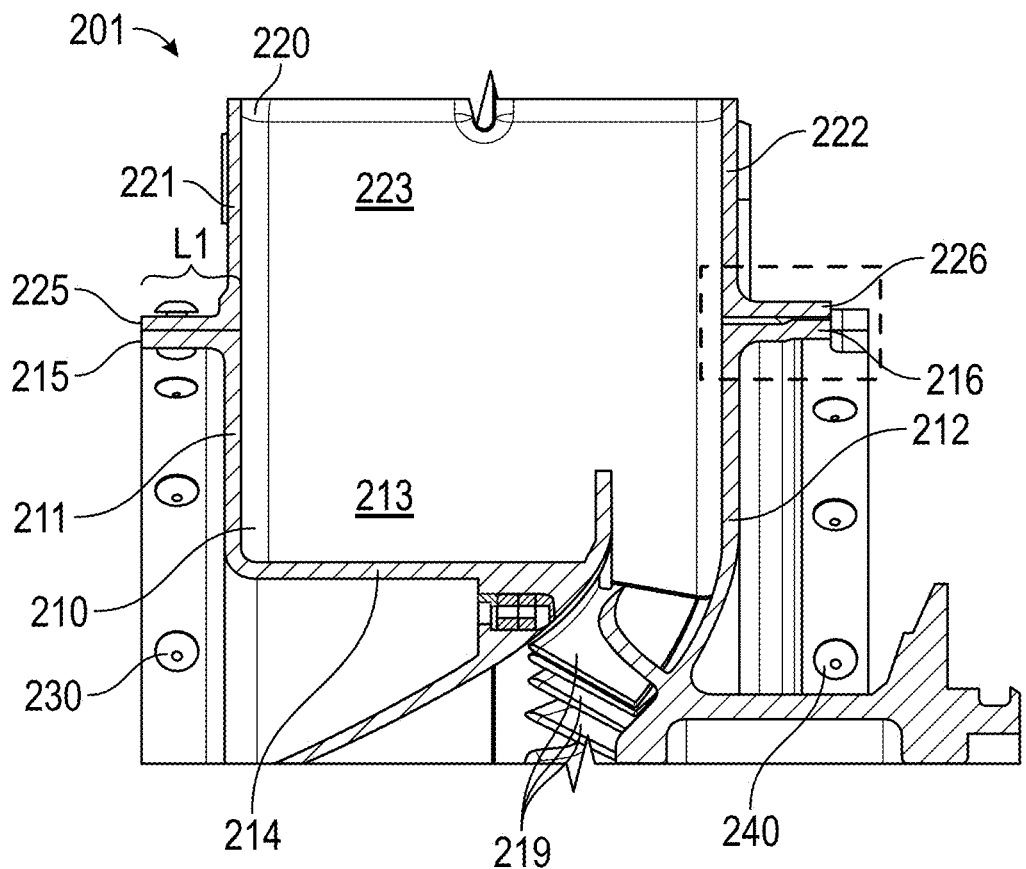
FIG. 2 is a side view of an example cooling fan housing in accordance with embodiments of this disclosure.
Figure 3:
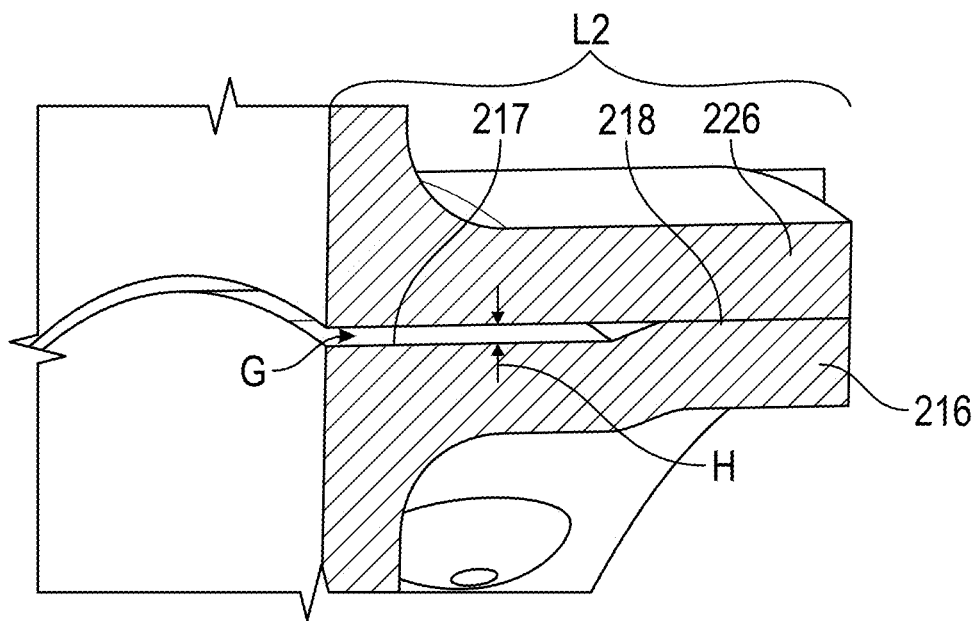
FIG. 3 is an enlarged view of a portion of the cooling fan housing of FIG. 2 in accordance with embodiments of this disclosure.

With reference to FIGS. 2 and 3, a cooling fan housing 201 is provided for use as a fan case (e.g., fan case 44 of FIG. 1). The cooling fan can provide low pressure air flow to cool an oil system through an air oil heat exchanger in a gas turbine engine configured as an auxiliary power unit (APU) in an aircraft.

The cooling fan housing 201 includes an inner housing 210 and an outer housing 220. The inner housing 210 includes forward and rearward radial walls 211 and 212 defining an inner annulus 213, a horizontal wall 214 delimiting an interior diameter of the inner annulus 213, an inner forward flange 215 and an inner rearward flange 216. The inner forward flange 215 extends axially forwardly from an outboard edge of the forward radial wall 211 and the inner rearward flange 216 extends axially rearwardly from an outboard edge of the rearward radial wall 212. The inner rearward flange 216 includes a recessed portion 217, which is proximate to the inner annulus 213, and a non-recessed portion 218 that is remote from the inner annulus 213. The inner housing 210 further includes integrally cast, machined or additively manufactured stator vanes 219 (which could also/instead be provided as part of the outer housing 220) inboard of the horizontal wall 214. The outer housing 220 includes forward and rearward radial walls 221 and 222 defining an outer annulus 223, an outer forward flange 225 and an outer rearward flange 226. The outer forward flange 225 extends axially forwardly from an outboard edge of the forward radial wall 221 and the outer rearward flange 226 extends axially rearwardly from an outboard edge of the rearward radial wall 222.

The outer and inner forward flanges 225 and 215 are attachable with one another by, for example, rivets 230 or another similar fastening element, in a tight-fitting or flush condition. The outer rearward flange 226 and the non-recessed portion 218 of the inner rearward flange 216 are attachable with one another by, for example, rivets 240 or another similar fastening element, in a tight-fitting or flush condition with the recessed portion 217 of the inner rearward flange 216 forming a gap G with a proximal portion of a surface of the outer rearward flange 226. Although the recessed portion 217 is depicted in FIGS. 2-5 as being incorporated into the inner rearward flange 216, this is not intended to be so limiting and the recessed portion may additionally (e.g., FIG. 7) or alternatively be associated with the outer rearward flange 226.

In accordance with embodiments, as will be understood by a person of ordinary skill in the art without undue experimentation, the rivets 230 and 240 can be replaced or substituted by welds and/or bolts. In addition, the rivets 240 (or other fastening elements) can be discarded from the attachment of the outer rearward flange 226 and the non-recessed portion 218 of the inner rearward flange 216.

The formation of the gap G as described above, can be achieved by at least one or more of casting, machining and additively manufacturing the inner housing 210 and machining the recessed portion 217. In any case, the presence of the gap G allows a location of the attachment of the outer rearward flange 226 and the non-recessed portion 218 of the inner rearward flange 216 in the tight-fitting or flush condition to be moved axially rearwardly (i.e., the location of the attachment of the outer rearward flange 226 and the non-recessed portion 218 of the inner rearward flange 216 in the tight-fitting or flush condition will be axially rearward of the gap G). This in turn allows tight fit stresses between the inner housing 210 and the outer housing 220 to be attenuated and in turn reduces assembly stresses experienced by several different features of the cooling fan housing 201.

As shown in FIGS. 2 and 3, a length L1 of the attachment of the outer and inner forward flanges 225 and 215 can differ from a corresponding length L2 of the attachment of the outer rearward flange 226 and the non-recessed portion 218 of the inner rearward flange 216 plus the gap G. More generally, it is to be understood that respective dimensions of the outer and inner forward flanges 225 and 215 can differ from respective dimensions of the outer and inner rearward flanges 226 and 216.

As also shown in FIG. 3, an aspect ratio of the gap G can be about 10 or more to 1 where the aspect ratio of the gap G is defined as the ratio of the length L2 to a height H of the gap G.

Figure 4:
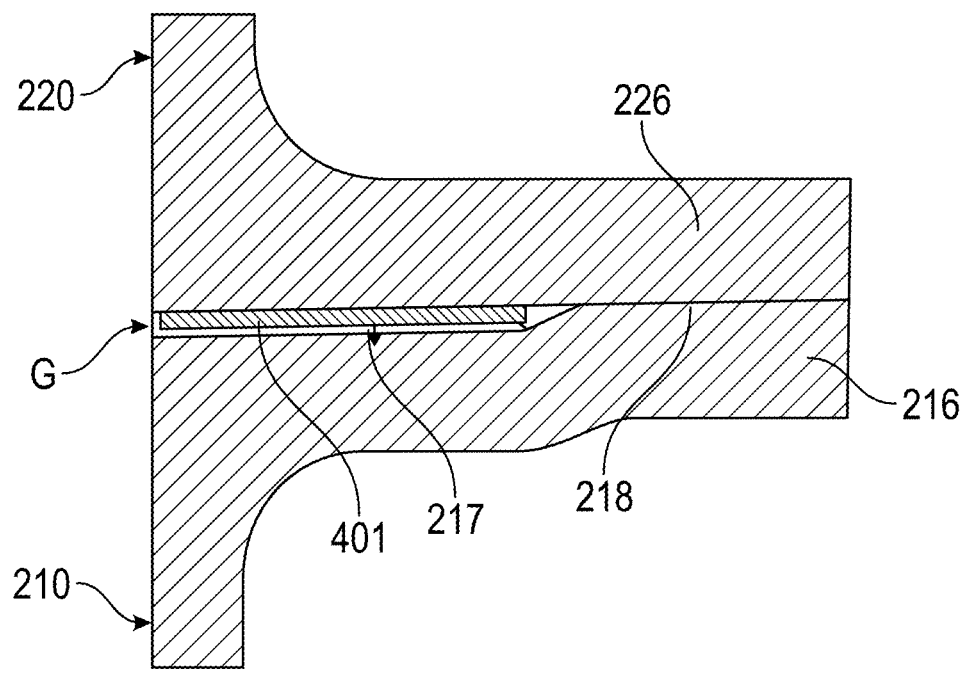
FIG. 4 is a side view of a portion of a cooling fan housing with a compliant seal in accordance with embodiments of this disclosure.

With continued reference to FIGS. 2 and 3 and with additional reference to FIG. 4, a compliant seal 401 can be interposed between a portion of a surface of the outer rearward flange 226 and the recessed portion 217 of the inner rearward flange 216. The compliant seal 401 can be formed of elastomeric material or another suitable material. The compliant seal 401 would be installed following the attachment of the outer rearward flange 226 and the non-recessed portion 218 of the inner rearward flange 216.

In accordance with embodiments, the inner and outer housings 210 and 220 can include or be formed of aluminum, alloys thereof and/or other similar metallic material and metallic alloys. In any case, the inner and outer housings 210 and 220 can include or be formed of materials having different coefficients of thermal expansion (CTEs). Particularly, in cases in which the cooling fan housing 201 includes the compliant seal 401 of FIG. 4, the compliant seal 401 can provide for sealing when thermal contraction/expansion affects dimensions of the attachment of the outer rearward flange 226 and the non-recessed portion 218 of the inner rearward flange 216.

Figure 5:
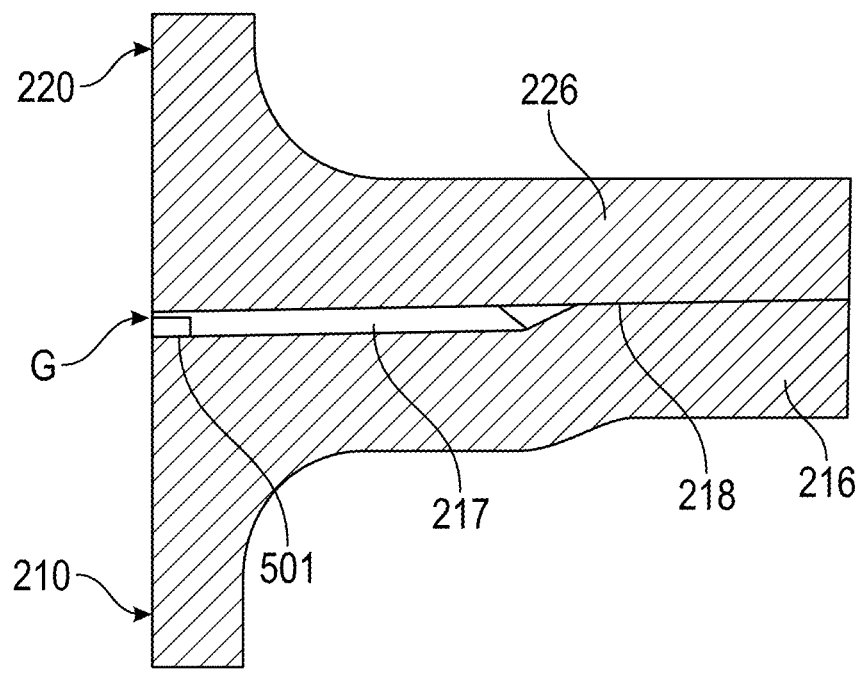
FIG. 5 is a side view of a portion of an example cooling fan housing with a wall section in accordance with embodiments of this disclosure.

With continued reference to FIGS. 2 and 3 and with additional reference to FIG. 5, the inner rearward flange 216 can further include a wall section 501 extending radially outwardly from the recessed portion 217. This wall section 501 could serve to control fluid flows within the cooling fan housing 201 but would not interface with the outer rearward flange 226 and thus would not affect the reduction of assembly stresses experienced by the several different features of the cooling fan housing 201.

Figure 6:
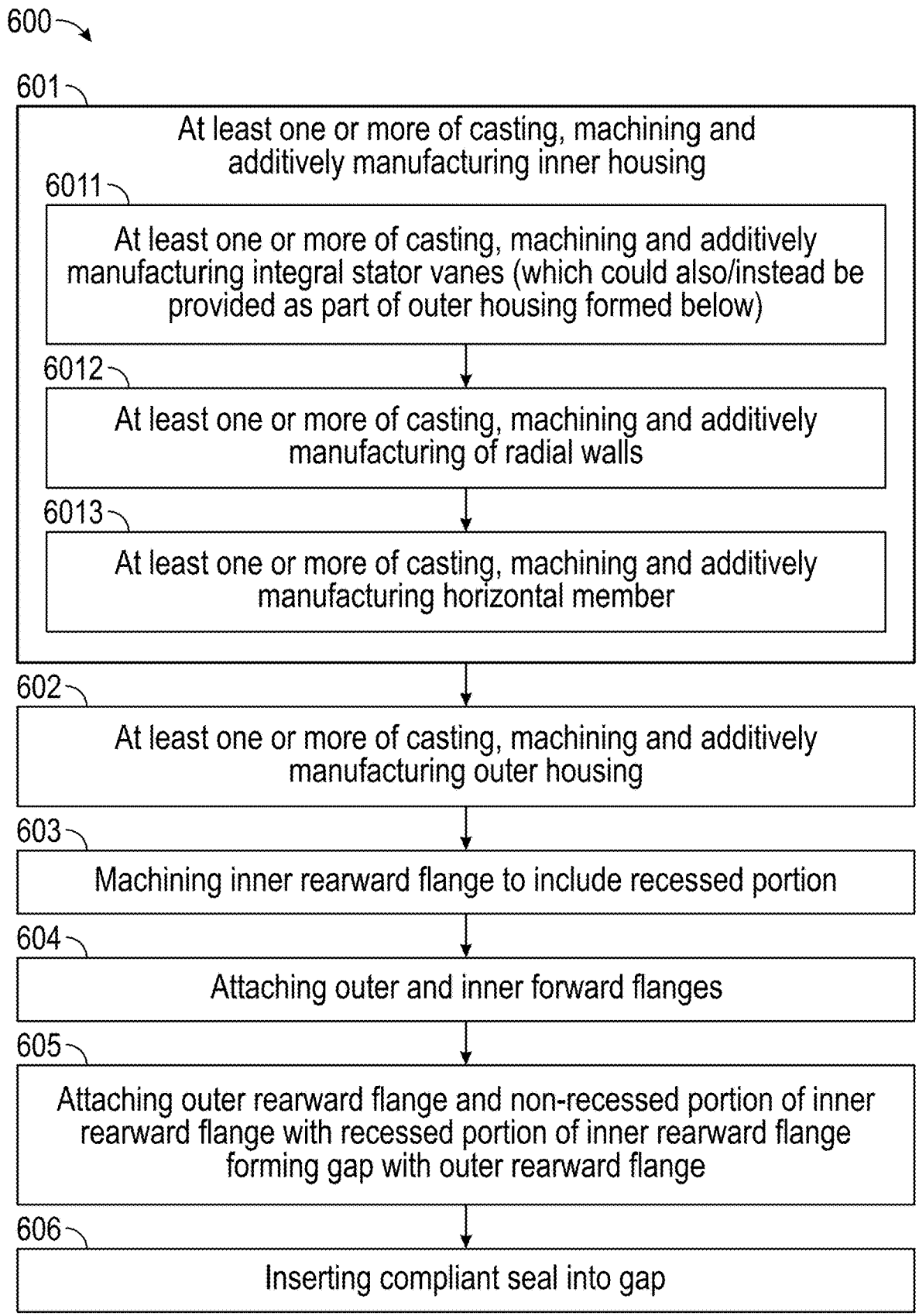
FIG. 6 is a flow diagram illustrating a method of assembling a cooling fan housing in accordance with embodiments of this disclosure.

With reference to FIG. 6, a method 600 of assembling a cooling fan housing, such as the cooling fan housing 201 described above, is provided. The method 600 includes at least one or more of casting, machining and additively manufacturing an inner housing including inner forward and inner rearward flanges on either side of an inner annulus (block 601), at least one or more of casting, machining and additively manufacturing an outer housing including outer forward and outer rearward flanges on either side of an outer annulus (block 602), machining the inner rearward flange to include a recessed portion proximate to the inner annulus and a non-recessed portion remote from the inner annulus (block 603), attaching the outer and inner forward flanges in a tight-fitting or flush condition (block 604) and attaching the outer rearward flange and the non-recessed portion of the inner rearward flange in a tight-fitting or flush condition with the recessed portion of the inner rearward flange forming a gap with the outer rearward flange (block 605).

In accordance with embodiments, the at least one or more of the casting, the machining and the additively manufacturing of the inner housing of block 601 can include at least one or more of casting, machining and additively manufacturing integral stator vanes (block 6011) though it is to be understood that stator vanes could be also/instead part of an outer housing, at least one or more of casting, machining and additively manufacturing radial walls defining the sides of the inner annulus (block 6012) and at least one or more of casting, machining and additively manufacturing a horizontal member extending from a forward one of the radial walls (block 6013). In accordance with further embodiments, the method 600 can further include optionally inserting a compliant seal into the gap (block 606) following the attaching of the outer rearward flange and the non-recessed portion of the inner rearward flange in the tight-fitting or flush condition of block 605.

Figure 7:
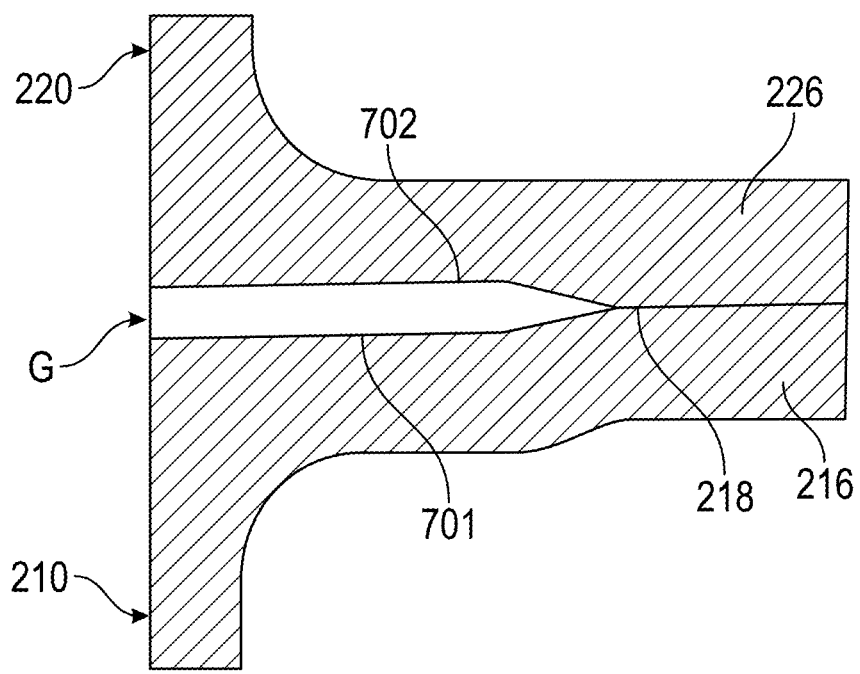
FIG. 7 is a side view of an example cooling fan housing with an enlarged gap in accordance with embodiments of this disclosure.

With reference to FIG. 7, the cooling fan housing 201 of FIG. 2 can be modified such that the inner rearward flange 216 and the outer rearward flange 226 both include recessed portions 701 and 702, respectively, to form an enlarged gap G2.

Technical effects and benefits of the present disclosure are the provision of a flange with a stress attenuation feature of a cooling fan housing of an APU of an aircraft that alleviates assembly stresses and in turn allows for increased part lifespan and increased dynamic stress margins.

The corresponding structures, materials, acts and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A cooling fan housing, comprising:
   an inner housing comprising inner forward and inner rearward flanges on either side of an inner annulus, the inner rearward flange comprising a recessed portion proximate to the inner annulus and a non-recessed portion remote from the inner annulus; and
   an outer housing comprising outer forward and outer rearward flanges on either side of an outer annulus,
   the outer and inner forward flanges being attachable in a first tight-fitting condition, and
   the outer rearward flange and the non-recessed portion of the inner rearward flange being attachable in a second tight-fitting condition with the recessed portion of the inner rearward flange forming a gap with the outer rearward flange,
   wherein respective dimensions of the outer and inner forward flanges are different from respective dimensions of the outer and inner rearward flanges.

2. The cooling fan housing according to claim 1, wherein the inner housing comprises:
   radial walls defining the sides of the inner annulus; and
   a horizontal member extending from a forward one of the radial walls.

3. The cooling fan housing according to claim 1, further comprising at least one of rivets, bolts and a weld to attach at least the outer and inner forward flanges.

4. The cooling fan housing according to claim 1, wherein an aspect ratio of the gap is 10 or more to 1.

5. The cooling fan housing according to claim 1, further comprising a compliant seal in the gap.

6. The cooling fan housing according to claim 1, wherein the inner and outer housings comprise materials having different coefficients of thermal expansion (CTEs).

7. The cooling fan housing according to claim 1, wherein the inner rearward flange further comprises a wall section extending radially outwardly from the recessed portion.

8. A method of assembling the cooling fan housing according to claim 1, the method comprising:
   at least one or more of casting, machining and additively manufacturing the inner housing comprising the inner forward flange and the inner rearward flanges on either side of the inner annulus;
   at least one or more of casting, machining and additively manufacturing the outer housing comprising the outer forward flange and the outer rearward flanges on either side of the outer annulus;
   machining at least the inner rearward flange to comprise the recessed portion proximate to the inner annulus, wherein at least the inner rearward flange comprises the non-recessed portion;
   attaching the outer and inner forward flanges in the first tight-fitting condition; and
   further attaching the outer rearward flange to the non-recessed portion of the inner rearward flange in the second tight-fitting condition, with the recessed portion of the inner rearward flange forming the gap with the outer rearward flange.

9. The method according to claim 8, wherein the at least one or more of the casting, the machining and the additively manufacturing of the inner housing comprises:
   at least one or more of casting, machining and additively manufacturing radial walls defining the sides of the inner annulus; and
   at least one or more of casting, machining and additively manufacturing a horizontal member extending from a forward one of the radial walls.

10. The method according to claim 8, further comprising inserting a compliant seal into the gap following the further attaching.

11. A cooling fan housing, comprising:
   a first housing comprising a first forward flange and a first rearward flange on either side of a first annulus; and
   a second housing comprising a second forward flange and a second rearward flange on either side of a second annulus,
   wherein:
   at least one of the first and the second rearward flanges comprises a recessed portion proximate to the first and second annuluses and a non-recessed portion remote from the first and second annuluses,
   the first and the second forward flanges are attachable in a first tight-fitting condition, and
   the non-recessed portion of the at least one of the first and the second rearward flanges are attachable in a second tight-fitting condition, with the recessed portion of the at least one of the first and the second rearward flanges forming a gap,
   wherein respective dimensions of the first and second forward flanges are different from respective dimensions of the first and second rearward flanges.

12. The cooling fan housing according to claim 11, wherein at least one of the first housing and the second housing comprises integral stator vanes.

13. The cooling fan housing according to claim 11, wherein the first housing comprises:
   radial walls defining the sides of the first annulus; and
   a horizontal member extending from a forward one of the radial walls.

14. The cooling fan housing according to claim 11, further comprising at least one of rivets, bolts and a weld to attach at least the first and the second forward flanges.

15. The cooling fan housing according to claim 11, wherein an aspect ratio of the gap is 10 or more to 1.

16. The cooling fan housing according to claim 11, further comprising a compliant seal in the gap.

17. The cooling fan housing according to claim 11, wherein the first and the second housings comprise materials having different coefficients of thermal expansion (CTEs).

18. The cooling fan housing according to claim 11, wherein the at least one of the first rearward flange and the second rearward flange further comprises a wall section extending radially into the recessed portion.

\* \* \* \* \*